June 19, 1962 W. S. VICKERMAN 3,039,244
TOOL GRINDING FIXTURE
Filed March 6, 1961 5 Sheets-Sheet 2
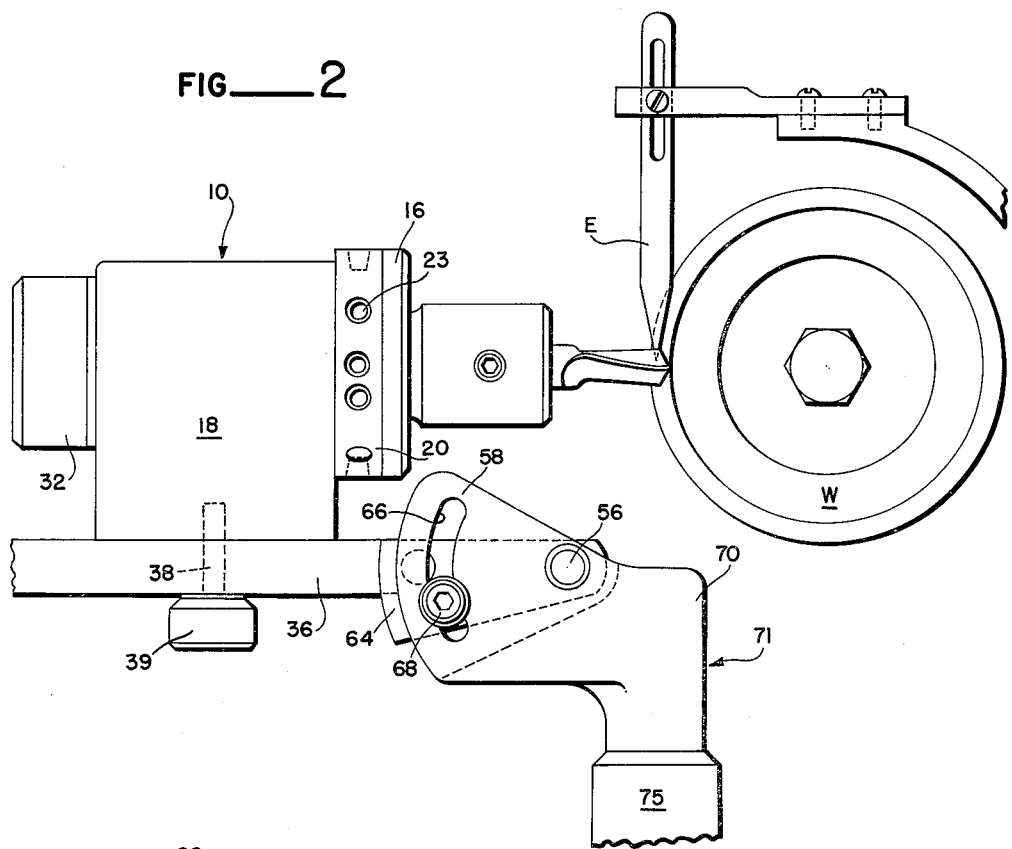
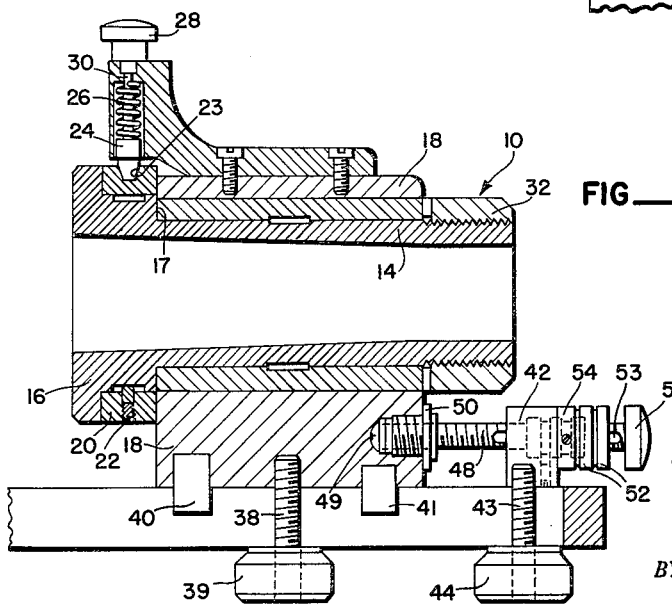
W. S. VICKERMAN
INVENTOR.

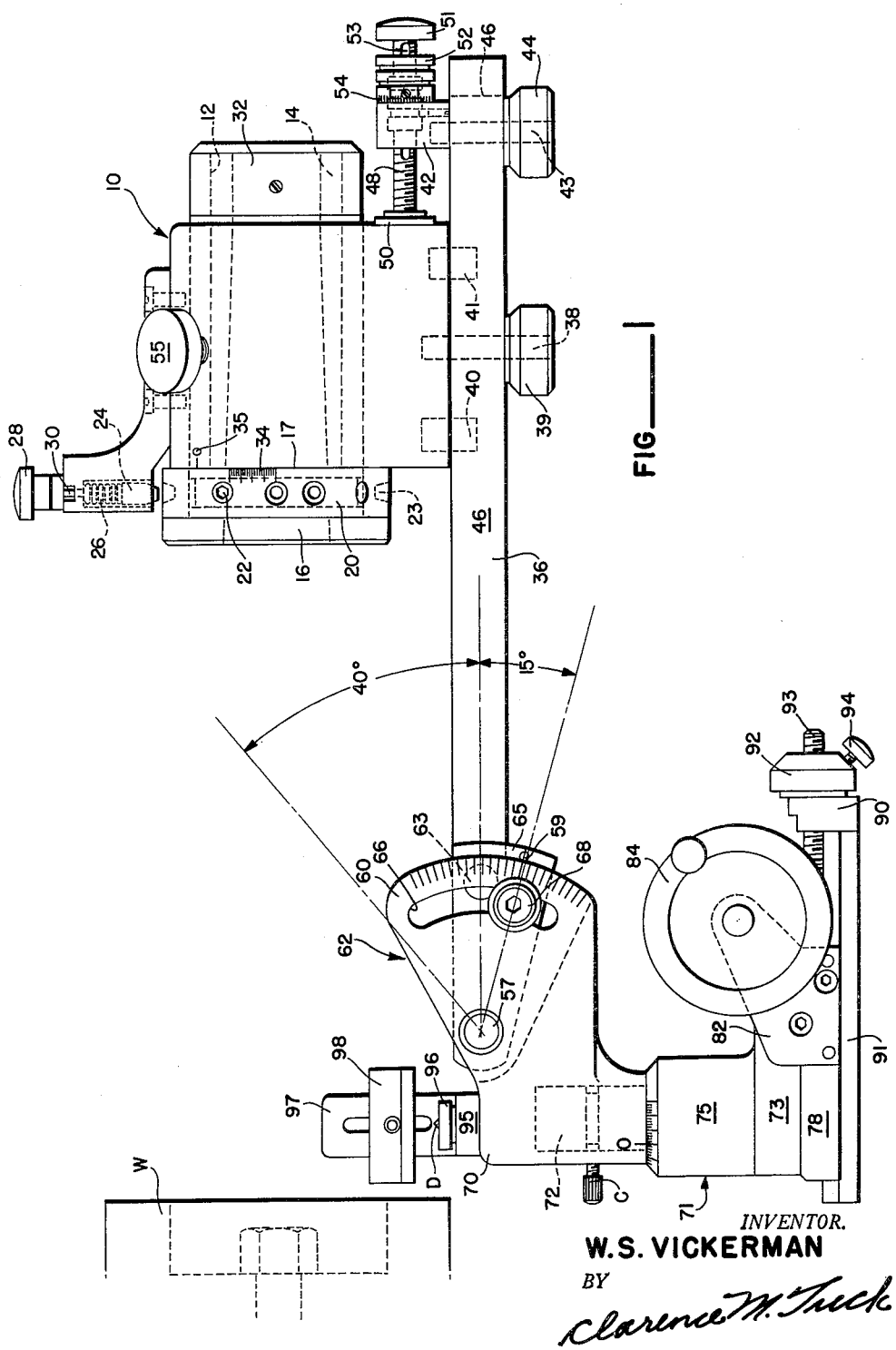

June 19, 1962 W. S. VICKERMAN 3,039,244
TOOL GRINDING FIXTURE

Filed March 6, 1961 5 Sheets-Sheet 3

W.S. VICKERMAN
*INVENTOR.*

BY
Clarence M. Tuck

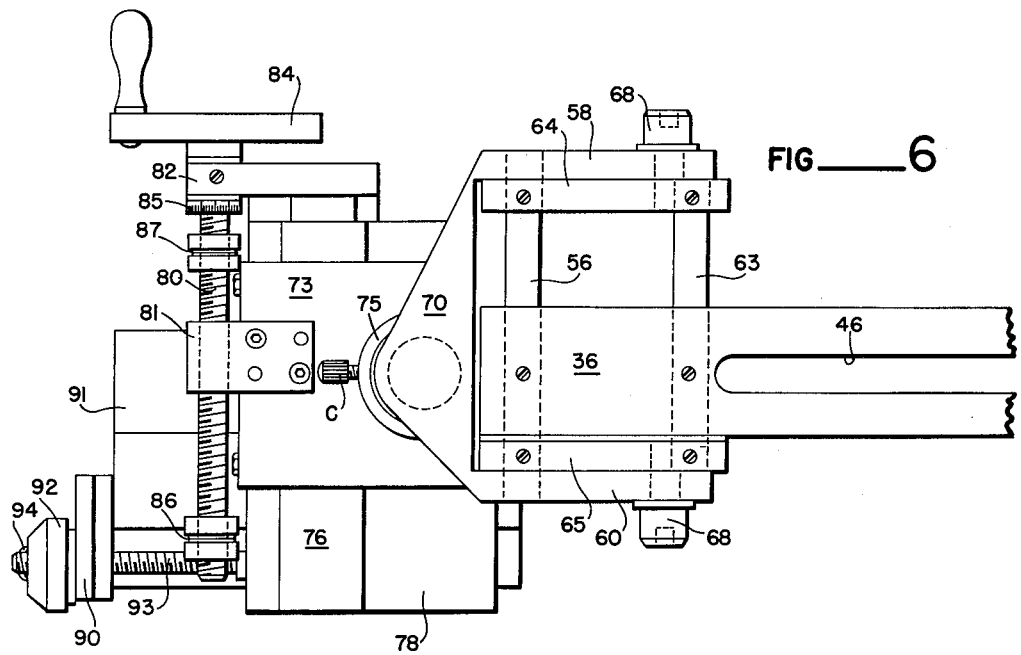
FIG__6
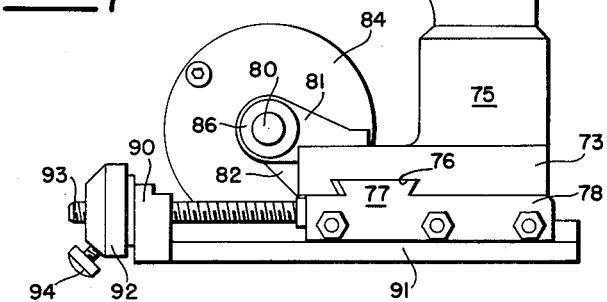
FIG__7
W.S. VICKERMAN
*INVENTOR.*

June 19, 1962 W. S. VICKERMAN 3,039,244
TOOL GRINDING FIXTURE
Filed March 6, 1961 5 Sheets-Sheet 5

W.S. VICKERMAN
INVENTOR.

BY
Clarence M. Tuck

United States Patent Office 3,039,244
Patented June 19, 1962

1

3,039,244
TOOL GRINDING FIXTURE
Wynn S. Vickerman, Rte. 1, Box 84A, Moses Lake, Wash.
Filed Mar. 6, 1961, Ser. No. 93,570
6 Claims. (Cl. 51—219)

This present invention relates to the general class of equipment employed to position various cutting tools such as tool bits, twist drills, reamers, taps, boring tools, milling cutters, end mills and various other tools that normally cut by being revolved with respect to the work piece to which they are applied, or which are held while work piece is revolved.

It is well recognized that it is now necessary to substitute a precise holding fixture for the eye of the skilled workman who formerly mastered the exacting technique required to accurately grind cutting tools of the type indicated above. In most instances special holders are provided for use with certain tools but the usefulness of these types of holders are normally so limited to the requirements for refinishing or initially finishing a certain tool that they cannot be used for other tools of slightly different design characteristics. For this reason it is usually necessary for many tool rooms to stock a large number of such holders which are not only expensive in first cost but which also usually require storage under carefully controlled conditions of the ambient air. I have provided in this present invention a new, different and universal tool grinding fixture which is complete in itself and does not require numerous accessories and attachments. The only required accessories are the standard tapered shank tool holders which are normally present in the average machine shop or tool room. Such standard tool holders can be employed in conjunction with my device to hold the various tools for which they are designed. It is therefore believed that this present tool grinding fixture will greatly assist in the precise handling and grinding of a wide range of cutting tools.

The principal object of this invention therefore is to provide a tool grinding fixture that is complete within itself and requires no especial accessories or attachments to adapt it to the needs of the average modern machine shop.

A further object of this invention is to provide means for accepting a wide range of tapered shank tool holders so that a wide range of cutting tools can be ground.

A further object of this invention is to provide means which will present tools, to be ground, against the usual motorized grinding wheel so they can be moved, positioned, rotated, angled or indexed to sharpen or grind all surfaces requiring grinding in a modern manufacturing facility, using any standard tool holder or chuck.

A further object of this invention is to provide means which will accept any cutting tool that can be positioned by a tapered shank and to so manipulate it under exacting control that all the surfaces requiring grinding can normally be properly presented to the usual type of motorized grinding wheel, all under conditions that admit of precise grinding operations.

Further objects, advantages and capabilities will be apparent from the description and disclosure in the drawings or may be comprehended or are inherent in the device.

In the drawings:
FIGURE 1 is an elevation of one physical embodiment of my tool grinding fixture with the cutting face of a motorized grinding wheel shown in operational position with the grinding fixture.

FIGURE 2 is a fragmentary view in elevation showing portions of my tool grinding fixture and illustrating the positioning of a cutting tool against a grinding wheel and also illustrating certain fixtures employed to determine the vertical position of the tool to be ground.

FIGURE 3 is a fragmentary vertical longitudinal sectional view through the index head of my fixture.

FIGURE 6 is a fragmentary top plan view rotated 180 degrees from the working position of the slotted beam employed with my fixture which illustrates certain of the means employed to position the axes of this beam with respect to the grinding wheel surface.

FIGURE 7 is a fragmentary view in elevation of the left hand end of FIGURE 1 but showing the parts from the opposite side of the fixture.

Figure 4:
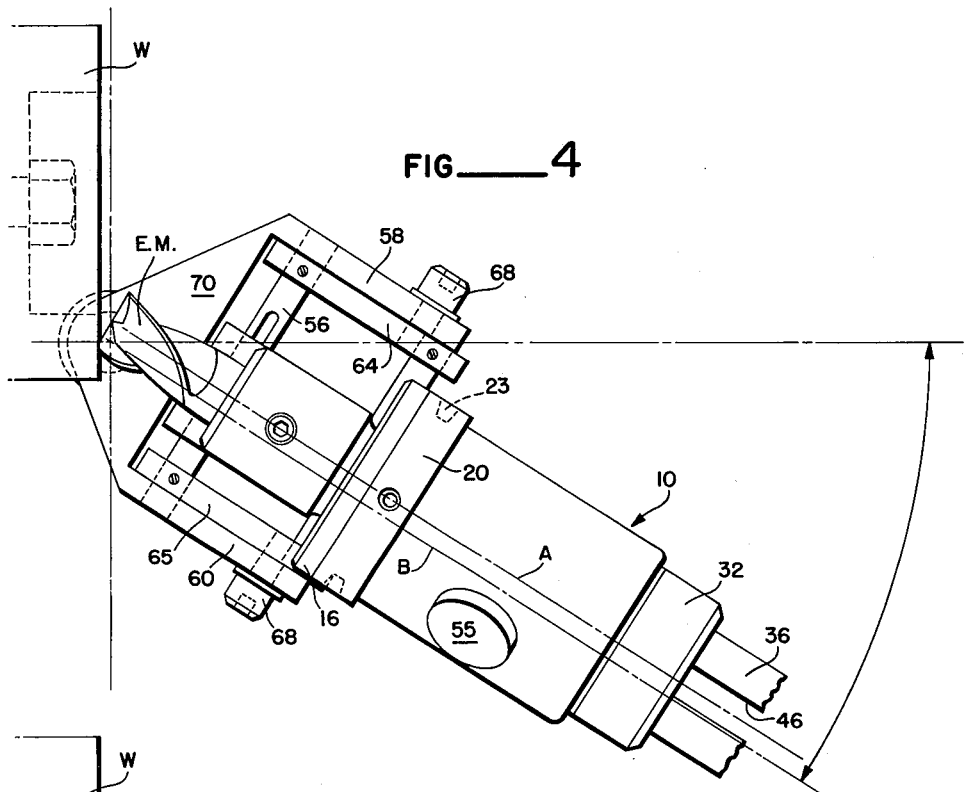
FIGURE 4 is a fragmentary top plan view, with certain upper parts removed, illustrating how my fixture is employed to present and end mill in proper radial relationship with a grinding wheel.
Figure 5:
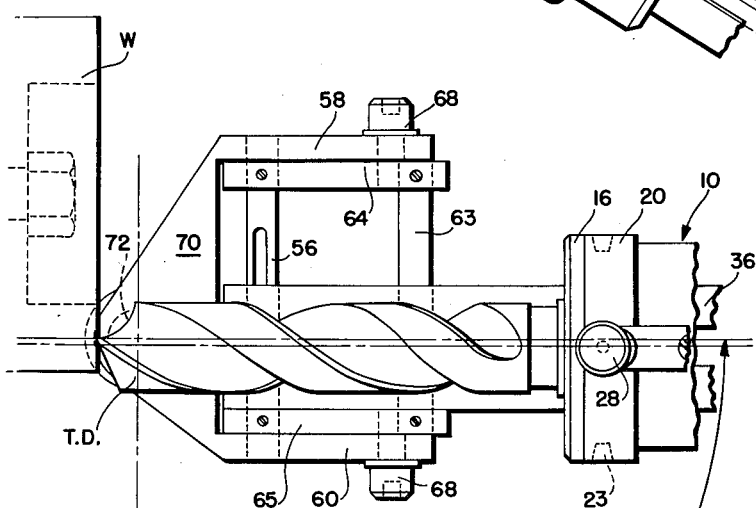
FIGURE 5 is a fragmentary top plan view, with certain upper parts removed, illustrating the setting up of a twist drill in front of a motorized grinding wheel.

Referring to the drawings, throughout which like reference characters indicate like parts, the numeral 10 designates generally the complete index head. This member provides a bore 12 in which the index head spindle 14 is revolvably positioned. The forward end of spindle 14 is formed as an integral flange 16 which is spaced apart from the forward edge 17 of the head housing 18 so that a removable index head ring 20 may be operably positioned. The index head ring is removably secured to the index head spindle 14 by the index head ring lock screw 22. This provision is made so that for various special uses the index head ring 20 can be removed and replaced with another one of more usable indexing means. In the form shown a plurality of conical recesses 23 are provided which are normally marked with certain calibrations in the openings and which accept the conical headed index head pin 24. The index head pin 24 is spring biased to seat in openings 23. As is usual with equipment of this order it is arranged so that by lifting up on hand piece 28 and giving its a quarter turn, bar 30 is raised out of its normal transverse slot and serves to hold the spring under compression with the opening engaging pin 24 retracted. FIGURES 1 and 3 illustrate acceptable means for mounting the index head pin directly to the upper portion of the spindle head housing 18.

Figure 8:
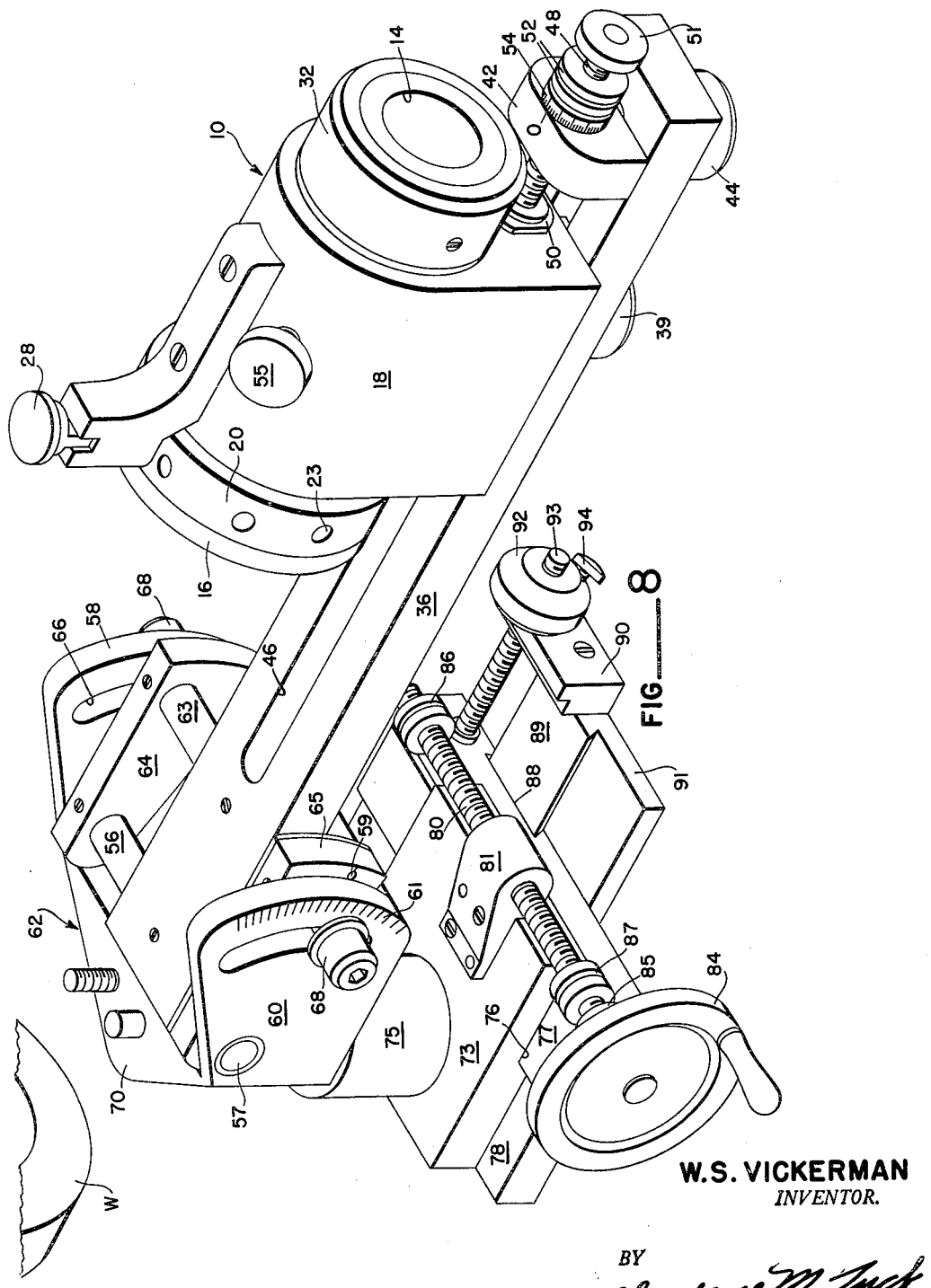
FIGURE 8 is a perspective view to illustrate the relationship of the various component parts of my tool grinding fixture.

The opposite end of spindle 14, remote from the grinding wheel W, has mounted on it the positioning collar 32, which is removably secured to spindle 14 by suitable set screws. It has been found convenient to have graduations on the index ring as indicated at 34, which can be used in association with a suitable index 35. The index head 10 as a unit is mounted for reciprocation upon the slotted beam 36. An index head positioning and lock screw 38 threadedly engages housing 18 and is free to move lengthwise of beam 36. A lock knob 39 is provided for locking the unit in its adjusted longitudinal position with respect to beam 36. Guides in the form of dowels are provided at 40 and 41 to maintain the parallel relationship of the axes of beam 36 and the index head 10. A beam feed block 42 is slidably mounted on the upper surface of beam 36 and is lockable in adjusted position in a controlled step-by-step manner by the feed block positioning screw 43. This screw is turned by the locking knob 44. The feed block positioning screw is also adapted to reciprocate within slot 46 which extends substantially the full length of beam 36, as is illustrated in FIGURE 8. The beam feed block 42 is threaded to accept the feed block feed screw 48 which in effect provides a micrometer type means for positioning the index head 10 along beam 36.

Feed screw 48 is provided with means so that it may turn with respect to the index head 10 but the end thereof is held captive within the gland structure indicated at 50 by screw 49. The feed screw is controlled by the feed block knob 51 and may be locked in an adjusted position by the feed block stop or jamb nuts 52. Screw 48 is grooved at 53 so that an index disc 54, having a suitable screw which engages slot 53, will turn as screw 48 is turned; but is free to move longitudinally of the screw as it progresses through the threads of beam feed block 42. An index head spindle lock screw 55 is provided so that spindle 14 may be locked in an adjusted position.

The slotted beam 36, which supports the index head assembly 10 is pivoted about the horizontally disposed hinge pin 56, probably best illustrated in FIGURE 6 and in FIGURE 1. Pin 56 is preferably secured in the unslotted end of beam 36 and revolves in the hinge pin bearings 57 which are secured within the spaced apart quadrant plates 58 and 60 which form part of the rotating angle head assembly indicated generally at 62. Beam 36 is further supported by the angle side plate dowel 63 which passes through the unslotted end of beam 36 at a point somewhat removed from hinge pin 56 and is anchored in the spaced apart angle side plates 64 and 65. These are pierced by the hinge pin 56 so that the side plates are in effect fixedly secured with relation to beam 36 and provide a means for securing it in a vertical adjusted position. The quadrant plates 58 and 60 have arcuate slots 66 which are generated using hinge pin 56 as a center. Disposed to slide in slots 66 are the angle side plate locking screws 68. These screws are tapped into the angle side plates 64 and 65 and when tightened frictionally secure beam 36 in its vertically adjusted position as it is adjusted around hinge pin 56. In order to provide an indexing means one of the quadrant plates as 60 may be graduated in angular measurement at 61 using hinge pin 56 as a center and a suitable index 59, for registry with the graduations, may be provided on the associated companion angle side plate 65.

The rotating angle head 62 has a web portion 70 joining the two quadrant plates 58 and 60. This web is of sufficient size to contain a vertical column 71 which is bored out to fit over the column axis pin 72. The manner of securing the rotating angle head to pin 72 is shown in FIGURE 1 in dotted lines. Pin 72 is secured within the upper slide member 73 having a rectangular lower slide portion 74 and a boss portion 75. Upper slide member 74 is provided with a dove-tailed transverse groove 76 adapted to coact with the dove-tailed key member 77 formed as part of the bottom slide member 78. The relative positioning of the upper slide assembly 74 and the bottom slide member 78 is adjusted by screw 80 which threadedly engages a bearing block 81 secured to the upper slide portion and is provided with a second bearing at 82. A hand wheel 84 is fixedly secured to screw 80 and forms a convenient means for turning the same. A flange bushing 85 prevents screw 80 from moving longitudinally and thus provides a means for accurately moving member 73. A pair of coacting jamb nuts are provided on each side of bearing block 81 and are indicated at 86 and 87 and serve as adjustable stops to limit the movement of the upper slide 73 with respect to the bottom slide 78. Bottom slide 78 has a dove-tailed groove 88 and dove-tailed key arrangement 89 whereby the bottom slide 78 can be moved longitudinally of base 91. An adjusting knob 92 may be fixedly secured to screw 93 by a locking screw 94 and thus knob 92 can provide both a means for turning screw 93 to effect the relative movement of bottom slide 78 and base plate 91 and also a means to jamb against threaded abutment 90 and lock these parts in an adjusted position.

For use in positioning long drills, reamers and the like, a tool support 95 is provided, preferably coaxially with the column axis pin 72 which may be adjustably positioned by clamp bolt 96. A slotted upper portion 97 is provided to assist in adjustably positioning support bracket 98.

METHOD OF USE

Twist Drill Grinding

*Step 1.*—Mount drill T.D. in Morse taper holder in the taper bore E of the indexing head 10. In case of a taper shank drill mount directly or with proper reducing sleeve. In case of straight shank drills use either a chuck or collets with taper shank.

*Step 2.*—Raise beam 36 to proper angle (31 degrees for 59 degree angle—118 degrees included angle commonly used). Tighten securely.

*Step 3.*—Swing attachment on base about pin 72 so drill point is toward you. Release binding screw C on pivot pin 72 to free pin.

*Step 4.*—Loosen binding screw 55 on index head (leave index pin 24 in any hole marked 2 or 4). Rotate drill and head until upper flute or cutting edge is vertical or 90 degrees to base. Tighten screw 55 in this position. Tighten lock screw 22 to bind spindle 16 and index ring 20.

*Step 5.*—Loosen binding screws 38 and 43 underneath beam 36 and slide entire head 10 so point of drill is approximately even with center line of pivot 72. Tighten screw 43 securely and lightly tighten screw 38.

*Step 6.*—Use combined feed and adjustment screw 51 by tightening stop nuts 52 and screw drill point the diameter of the drill past the center line of pivot 72, as indicated by point D. (Note: In sharpening drills, use is made of bracket 95 held in place by screw 96 which has a point D on the upwardly projected axis of column axis pin 72. The angle rest 98 is vertically adjusted to support free end of drill.)

*Step 7.*—Feed twist drill T.D. into wheel W and then loosen the stop nuts 52. Turn knob 51 up to stop position and again tighten stop nuts 52. This provides a stop so other flutes will be ground to same length when indexed.

*Step 8.*—Swing fixture horizontally back and forth to grind drill.

*Step 9.*—Index 180 degrees in diametrical opposite hole with indexing pin 24 and grind opposite flute. Spacers S of predetermined thickness may be employed as in FIGURE 4 to give a quick and accurate setting of beam 36 on hing pin 56 and dowel 63 with certain grinding operations it may be desirable to employ a vertical or horizontal center tool rest E supported by and forming part of the motor driven wheel W assembly as shown in FIGURE 2. This tool rest forms no part of this present invention.

To Grind Radii on End Mills

*Step 1.*—Use a suitable size cup or flaring cup wheel W. Mount end mill E.M. in regular end mill holder either with number 4 Morse taper shank or with whatever sleeve is necessary to fit.

*Step 2.*—Set beam 36 in angle head for radius grinding to the following formula: ½ diameter of end mill minus radius to be ground equals amount to set over beam on sliding pins 56 and 63 the distance from the center line of beam 36, line A to offset position line B (FIGURE 4).

*Step 3.*—Loosen set screws on cross slide hinge pin 56 and dowels 63 and using adjustable parallel gage blocks or proper spacers, slide beam 36 and index head assembly 10 over as indicated in FIGURE 4 and tighten set screws to hold the index head in the adjusted position.

*Step 4.*—Rotate beam 36 and indexing head 10 at right angles to wheel.

*Step 5.*—Using feed nut 92 (locked on screw 93 by screw 94). Adjust periphery of end mill to just touch wheel after assuring proper back off angle by rotating index head and locking. Lock nut 92 against stop.

*Step 6.*—Slide index head 10 back and rotate beam 36 parallel with center line of grinder motor.

*Step 7.*—Adjust index head 10 toward wheel W. Make fine adjustment with feed nut 51 and finally lock against stops nuts 52 and the set up is ready to grind.

*Step 8.*—Back feed screw 51 to make first cut, then feed into stop 52 progressively swinging the head about pin 72 to grind off a few thousandths of an inch with each swing. When feed nut 51 is against stop 52 on last cut, radius is ground on that flute. Back off feed 51, index and repeat for each flute.

It is believed that it will be clearly apparent from the description and the disclosure in the drawings that the invention comprehends a novel construction of a tool grinding fixture adaptable to many uses.

Having thus disclosed the invention, I claim:

1. A tool grinding fixture for grinding cutting tools used in drill presses, lathes, milling machines and similar equipment, comprising: an indexing head having a body with a cylindrical bore therethrough, a spindle revolvably positioned in said bore and having a standard taper bore, a flange on said spindle at the large end of said taper bore and a set collar on said spindle at the small end of said taper bore; an index head ring, having peripheral indexing holes, disposed between said flange and the end of said body; a spring biased index head index pin operatively secured to said body and adapted to engage said indexing holes and coact therewith to provide a spindle indexing means; a longitudinally slotted beam adapted to slidably support said body; dowel means slidably disposed in the slot of said beam and secured to said body to guide it along said beam; clamp means for securing said body in adjusted position on said beam and indexing means for moving said body along said beam; a rotating angle head disposed for revolution in a horizontal plane about a vertical axis; said angle head having spaced apart quadrant plates; angle side plates disposed in face contact with the inside faces of said quadrant plates; a horizontal hinge pin revolvably supported at each end in said quadrant plates and an angle side plate dowel secured at each end in said angle side plates in parallel spaced relationship to said hinge pin; a column axis pin and an upper slide; a boss forming part of said upper slide, vertically positioning said axis pin; a bottom slide slidably secured to said upper slide and a base plate slidably secured to said bottom slide for movement at right angles to the movement of said upper slide and said lower slide and means for fixedly positioning said coacting slides with respect to each other; said angle side plates disposed one on each side of the unslotted end of said beam and pierced to engage said hinge pin at one of their ends and an angle side plate dowel at their opposite ends; means for releasably securing said beam against sliding on said hinge pin and said dowel to permit off-setting the axis of said beam; arcuate slots in said quadrant plates; angle side plate locking screws slidably disposed in said arcuate slots and threadedly engaging said angle side plates to provide adjustable vertical positioning means for said slotted beam and indexing means to indicate the vertical angular position of said slotted beam.

2. A tool grinding fixture for grinding cutting tools used in drill presses, lathes, milling machines and similar equipment, comprising: an indexing head having a body with a cylindrical bore therethrough, a spindle revolvably positioned in said bore and having a tool receiving bore; said indexing head having rotary indexing means for angularly positioning said spindle; a slotted beam adapted to slidably support said body and mounted for vertically pivoting from one end and guiding means slidably disposed in the slot of said beam and secured to said body to guide it along said beam; clamp means for securing said body in adjusted position on said beam and indexing means for moving said body along said beam in a controlled step-by-step manner; a rotating angle head disposed for revolution in a horizontal plane about a vertical axis; said angle head having a horizontal hinge pin revolvably supporting one end of said slotted beam and providing additional beam supporting means, spaced from said hinge pin; and upper slide having a column axis pin vertically positioned on its upper surface; a bottom slide slidably secured to said upper slide and a base plate slidably secured to said bottom slide and movable at right angles to the movement of said upper slide and said lower slide and means for positioning said coacting slides and locking them in position with respect to each other; means for releasably securing said beam on said hinge pin to provide transverse movement for said beam; adjustable positioning and locking means for said slotted beam and indexing means to indicate the vertical angular position of said slotted beam.

3. The subject matter of claim 2 wherein said indexing means for moving said body along said beam comprises: a feed screw disposed in parallel relationship to said slotted beam and revolvably anchored in said index head body; a beam feed block disposed for movement along said beam and having a feed block positioning screw for controlling the movement of said feed block along said beam; said feed screw passing through said feed block and having threadedly disposed thereon a pair of jamb nuts to form an adjustable stop; a feed block indicating dial disposed between said jamb nuts and said beam feed blocks; a longitudinal groove on the surface of said feed screw and a radially disposed screw passing through said indicating dial and engaging said groove to provide means to insure that the dial will turn with said screw.

4. A tool grinding fixture for grinding cutting tools used in drill presses, lathes, milling machines and similar equipment, comprising: an indexing head having a body with a cylindrical bore therethrough, a spindle revolvably positioned in said bore and having a tool receiving bore; said indexing head having rotary indexing means for angularly positioning said spindle; a slotted beam adapted to slidably support said body and mounted for vertically pivoting from one end and guiding means slidably disposed in the slot of said beam and secured to said body to guide it along said beam; clamp means for securing said body in adjusted position on said beam and indexing means for moving said body along said beam in a controlled step-by-step manner; a rotating angle head disposed for revolution in a horizontal plane about a vertical axis; said angle head having a horizontal hinge pin revolvably supporting one end of said slotted beam and providing additional beam supporting means, spaced from said hinge pin; a base plate for supporting said tool grinding fixture; a column axis pin vertically disposed to revolvably support said rotating angle head; means supported by said base plate for moving and adjustably positioning said axis pin toward a grinding wheel; means for moving said axis pin transversely of the line of movement toward said grinding wheel and also transversely of said base plate; adjustable positioning and locking means for said slotted beam and indexing means to indicate the vertical angular position of said slotted beam.

5. A tool grinding fixture for grinding cutting tools used in drill presses, lathes, milling machines and similar equipment, comprising: an indexing head having a body with a cylindrical bore therethrough, a spindle revolvably positioned in said bore and having a tool receiving bore; said indexing head having rotary indexing means for angularly positioning said spindle; a beam adapted to slidably support said body and mounted for vertically pivoting from one end and guiding means slidably disposed in respect to said beam and to guide said body along said beam; clamp means for securing said body in adjusted position on said beam; threaded means for moving said body along said beam under threaded control from said adjusted position; a rotating angle head disposed for revolution in a horizontal plane about a vertical axis; said angle head having a horizontal hinge pin revolvably supporting one end of said beam and said angle head providing additional beam supporting means, spaced from said hinge pin; a slide having a column axis pin vertically positioned on its upper surface; a base plate supporting said slide and means for moving said slide longitudinally and transversely of said base plate and means for positioning said coacting slide and base plate in locked position with respect to each other.

6. The subject matter of claim 5 in which said means for positioning said coacting slide and base plate in locked position, comprises: a longitudinally disposed screw disposed to move said column axis pin longitudinally of said base plate; said screw having a knob threadedly disposed thereon and said screw also passing through a threaded abutment; a locking screw passing radially through said knob to lockably engage said longitudinally disposed screw and secure said knob thereto to provide a jamb lock against said abutment; a transversely disposed screw passing through a threaded bearing block secured to said coacting slide and passing through a second bearing to provide transverse movement of said column axis pin with respect to said base plate; pairs of lock nuts disposed on each side of said threaded bearing block to provide adjustable indexed stops for said transverse movement of said axis pin and a handwheel operatively secured to said transversely disposed screw to facilitate movement of said column axis pin.

References Cited in the file of this patent
UNITED STATES PATENTS

| | | |
|---|---|---|
| 766,978 | Symington | Aug. 9, 1904 |
| 2,107,921 | Weed | Feb. 8, 1938 |
| 2,580,884 | Bowman | Jan. 1, 1952 |
| 2,768,485 | Clarke | Oct. 30, 1956 |